United States Patent
Lamsbach et al.

[19]

[11] Patent Number: 6,035,638
[45] Date of Patent: Mar. 14, 2000

[54] INTERNAL COMBUSTION ENGINE WITH EXHAUST GAS TURBOCHARGER

[75] Inventors: Siegfried Lamsbach, Stuttgart, Germany; Marco Schade, Endingen, Switzerland; Erwin Schmidt, Baltmannsweiler; Siegfried Sumser, Stuttgart, both of Germany

[73] Assignee: DaimlerChrysler AG, Stuttgart, Germany

[21] Appl. No.: 09/022,920

[22] Filed: Feb. 12, 1998

[30] Foreign Application Priority Data

Feb. 13, 1997 [DE] Germany ............................ 197 05 422

[51] Int. Cl.⁷ .................................................. F02D 23/00
[52] U.S. Cl. .............................................. 60/602; 415/145
[58] Field of Search ............................... 60/602; 415/145

[56] References Cited

U.S. PATENT DOCUMENTS 4,530,640 7/1985 MacInnes ................................. 60/602
4,597,265 7/1986 Buck et al. ............................... 60/611

FOREIGN PATENT DOCUMENTS

| 29 01 041 | 2/1990 | Germany . |
| 42 32 400 | 8/1993 | Germany . |
| 59-93924 | 5/1984 | Japan ........................ 60/602 |
| 2 114 220 | 8/1983 | United Kingdom . |

*Primary Examiner*—Noah P. Kamen
*Attorney, Agent, or Firm*—Klaus J. Bach

[57] ABSTRACT

In an internal combustion engine with a turbocharger with a turbine wheel arranged in its exhaust gas duct system and an exhaust gas release arrangement disposed in the exhaust gas duct system ahead of the turbine wheel of the turbocharger, the exhaust gas release arrangement comprises a valve with a valve seat formed in such a way that different controllable operating state-based flow cross-sections are provided for the controlled release of exhaust gases from the exhaust gas duct system ahead of the turbine wheel during motor brake and during power operation of the internal combustion engine.

10 Claims, 1 Drawing Sheet

INTERNAL COMBUSTION ENGINE WITH EXHAUST GAS TURBOCHARGER

BACKGROUND OF THE INVENTION

The invention relates to an internal combustion engine with an exhaust gas turbocharger having an exhaust gas turbine with a turbine wheel arranged in an exhaust duct and an exhaust gas release arrangement disposed in the exhaust duct upstream of the turbine wheel.

DE 42 32 400 C1 discloses an exhaust gas turbocharger with variable turbine geometry for an internal combustion engine. The turbocharger includes an annular insert arranged between a spiral turbine inlet conduit of the turbine of the exhaust gas turbocharger and a turbine wheel so as to be slideable such that the flow cross-section for the exhaust gas is adjustable depending on certain operating parameters of the internal combustion engine.

The arrangement however, has the disadvantage that, upon reaching a certain load limit, the gas admission cross-section is restricted to such a degree that the exhaust gas flow through the turbine of the exhaust gas turbocharger is insufficient to generate sufficient power for proper operation of the compressor of the turbocharger.

DE 29 01 041 C2 discloses an exhaust gas turbocharger, which includes an exhaust gas bypass duct and a pressure control valve by way of which it can be adapted to the operating state of an internal combustion engine. The internal combustion engine and the exhaust gas turbocharger are to be protected by way of the exhaust gas bypass duct and the pressure control valve from overloads.

The arrangement, however, is complicated as far as its design and its control requirements are concerned. In addition, it requires complex passageways, which generate undesirable turbulence and consequently power losses for the exhaust gas turbocharger.

Also, exhaust gas discharge valves are known in the art by way of which exhaust gas is released from exhaust gas duct systems. They serve to eliminate load peaks of the internal combustion engine and of the exhaust gas turbocharger.

Such exhaust gas discharge valves, however, have the disadvantage that they permit to limit the pressures only in the exhaust gas duct system. The exhaust gas discharge valves open when a certain load limit is reached and release the exhaust gas from the exhaust gas duct system. This causes a sudden pressure drop in the exhaust gas duct system resulting in a power loss in the exhaust gas turbocharger.

It is therefore the object of the present invention to provide an internal combustion engine with an exhaust gas turbocharger in which an overloading of the exhaust gas duct system and of the internal combustion engine by an excessive charge air pressure is avoided and, during motor braking operation as well as power operation of the engine, an air flow to the engine is maintained as it is needed for optimal operation of the internal combustion engine.

SUMMARY OF THE INVENTION

In an internal combustion engine with a turbocharger arranged in its exhaust gas duct system and an exhaust gas release arrangement disposed in the exhaust gas duct system ahead of the turbine wheel of the turbocharger, the exhaust gas release arrangement comprises a valve with a valve seat formed in such a way that different controllable operating state-based flow cross-sections are provided for the controlled release of exhaust gases from the exhaust gas duct system ahead of the turbine wheel during motor brake and during power operation of the internal combustion engine so as to provide for greater control sensitivity during engine braking operation than during engine power operation.

The gas release flow is properly adjustable by a gas release arrangement permitting to vary the cross-section between a valve body and a valve seat of a gas discharge valve. The different flow cross-sections are preferably so selected that they provide for predetermined gas flows out of the exhaust gas system during engine braking operation and during engine power operation.

This is advantageous because an exhaust gas turbocharger can then become fully effective already at a substantially lower engine speed since the turbocharger can then be operated along a limit curve from a load to an excess load range as the exhaust gas release can be accurately controlled. As a result, an internal combustion engine can be charged with an optimal charge air pressure whereby an optimal air/fuel ratio lambda in the combustion chamber of the internal combustion engine is established which provides for a low fuel consumption.

Advantageous embodiments of the invention will be described below on the basis of the accompanying drawings.

DESCRIPTION OF A PREFERRED EMBODIMENT

Figure 1:
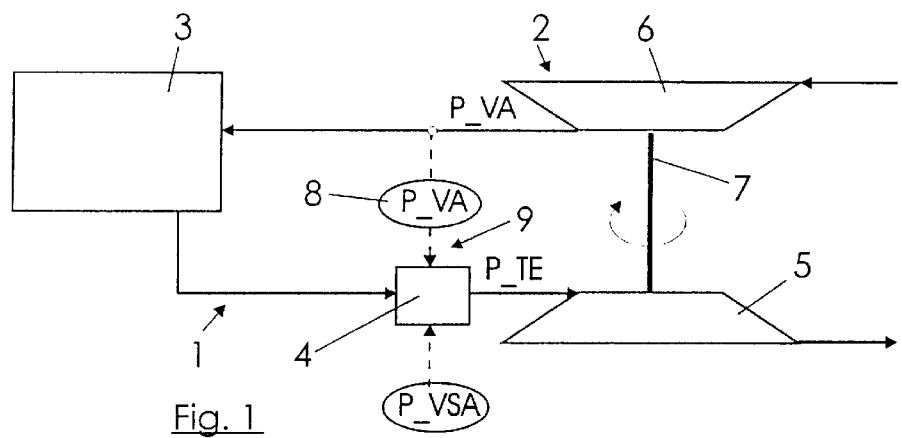
FIG. 1 shows schematically an exhaust gas duct system with an exhaust gas turbocharger of an internal combustion engine including an exhaust gas release arrangement.

FIG. 1 shows an exhaust gas duct system 1 with an exhaust gas turbocharger 2, an internal combustion engine 3 and an exhaust gas release arrangement 4. The exhaust gas turbocharger 2 includes an exhaust gas turbine 5 and a compressor 6, the exhaust gas turbine 5 being driven by the exhaust gas from the internal combustion engine 3. The exhaust gas turbine 5 drives, by way of a drive shaft 7, a compressor 6 which supplies compressed fresh charge air having a charge pressure P-VA corresponding to the discharge pressure of the compressor 6. The discharge pressure P-VA is measured by a measuring device 8 and compared in a control circuit 9 with a desired discharge pressure P-VSA of the compressor 6, which is the control value for this control circuit. The desired discharge pressure P-VSA is calculated by way of a function which is formed by operating parameters of the internal combustion engine 3, such as the speed or the load state of the internal combustion engine 3. The operating parameters are recorded in performance graphs of an electronic engine control unit which is not described herein.

The inlet pressure P-TE of the exhaust gases entering the exhaust gas turbine 5 is the basic factor for the power which can be transferred from the exhaust gas turbine 5 to the compressor 6. This means that the discharge pressure P-VA of the compressor depends on the inlet pressure P-TE of the exhaust gas turbine 5.

Figure 2:
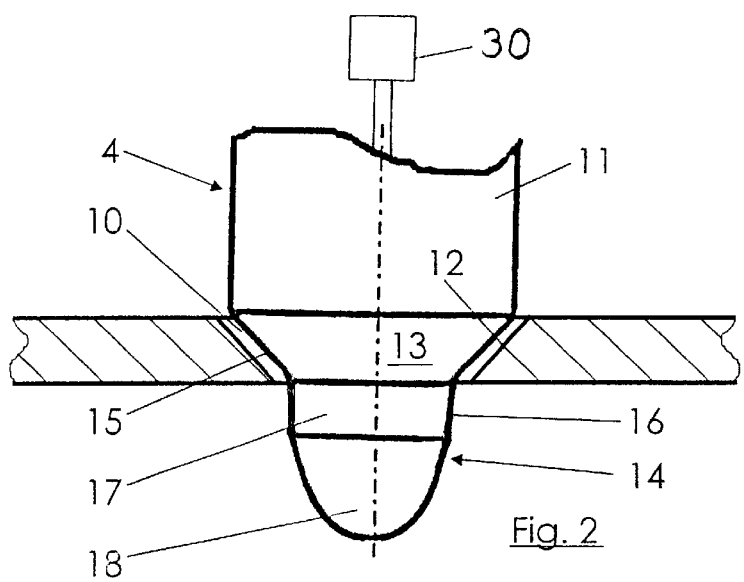
FIG. 2 shows a valve body of an exhaust gas release arrangement with a valve body seat area and an adjacent control end section.

According to the valve embodiment of FIG. 2, the inlet pressure P-TE of the exhaust gas turbine 5 is controlled by means of a variable flow cross-section 10. The flow cross-section 10 is established between a valve body 11 and a corresponding valve seat 12 of the exhaust gas release arrangement 4 by a lift movement of the valve body 11 from the valve seat 12. For the control of P-TE an accurately defined exhaust gas volume which is adapted to a particular operating state, that is, either motor braking operation or engine power operation, is released from the exhaust gas duct system through the flow cross-section 10. In this way, the power transmitted from the exhaust gas turbine 5 to the compressor 6 can be so controlled that the actual compressor discharge pressure P-VA corresponds to the desired compressor discharge pressure.

As shown in FIG. 2, the valve body 11 includes for this purpose a valve body seat surface 13 which is cone-shaped. Adjacent the cone-shaped seat surface 13, there is provided an end section 14, which extends past the valve opening 15 and which has a shape defined by a meridian curve section 16 which is adapted to the operating characteristics of the internal combustion engine 3.

The adaptation of the meridian curve section 16 is such that the shape of the curve forming the meridian curve section from the valve seat surface 13 up to the tip of the valve body 11 provides for a predetermined flow cross-section 10 depending on a predetermined lift location of the valve body 11. In this way, a well controlled amount of exhaust gas can be released from the exhaust gas duct system accurately adapted to experimentally determined operating characteristics of the internal combustion engine 3. As a result, the power output of the exhaust gas turbine 5 can be accurately controlled in a stepless fashion.

The end section 14 of the valve body 11 is divided into two areas, a first area 17 which is disposed directly adjacent the valve seat surface 13 and which is mainly used for engine braking operation and a second area 18 which follows the first area 17 and which is used during engine power operation.

The angle of inclination of the tangents of the meridian curve section 16 is greater in the first area 17, then it is in the second area 18 whereby, with the same lift movement of the valve body 11, smaller changes of the flow cross section 10 are obtained in the first area 17 than in the second area 18.

The two area design of the end section 14 of the valve body 11 takes the different exhaust gas volumes into consideration which are generated during braking operation and during power operation of the internal combustion engine 3. Since smaller exhaust gas amounts are generated during engine braking operation than during engine power operation, the exhaust gas release must be controlled during engine braking operation with a substantially more sensitive dosing capability for the exhaust gas release flow from the exhaust gas duct system 1 in order to prevent a power loss of the compressor 6 and accordingly a loss of the motor braking capability of the internal combustion engine 3.

With engine power operation or under full load operation of the internal combustion engine 3 relatively large flow cross-sections 10 are required for controlling the gas inlet pressure P-TE of the exhaust gas turbine 5 to provide the desired discharge pressure P-VA of the compressor 6.

By appropriate adaptation of the meridian curve 16 of the valve body 11 to the operating characteristics of the internal combustion engine 3, the exhaust gas turbocharger 2 can be operated at its maximum power level at all times. This power level may be so defined that particularly during motor braking operation, the exhaust valves of the engine which are not shown are just not not pushed open by the exhaust gas back pressure in the exhaust gas duct system 1 of the internal combustion engine such that the obtainable motor braking power is at the greatest possible value.

Figure 3:
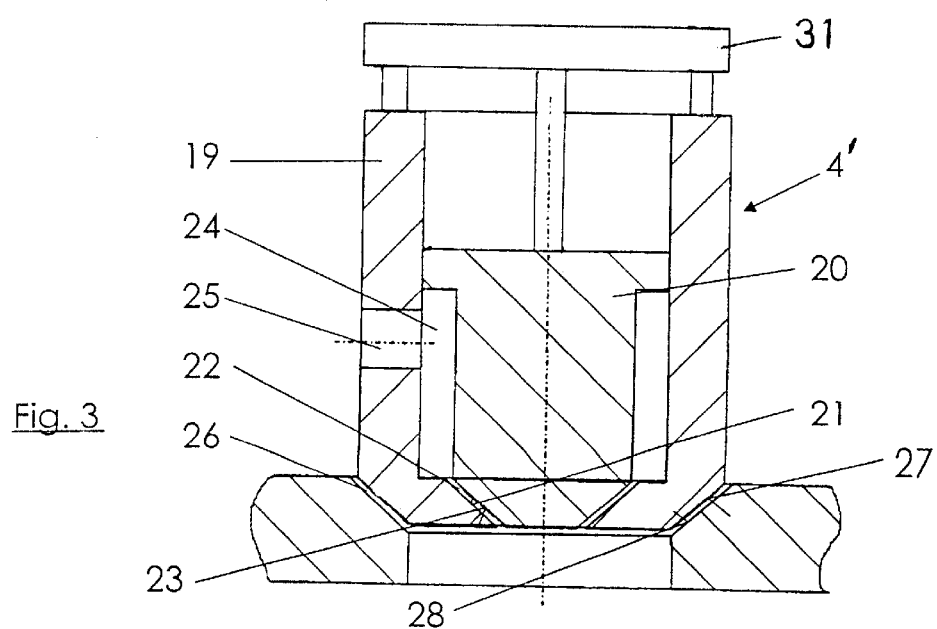
FIG. 3 shows a valve structure with an inner and an outer valve body of an exhaust gas release arrangement for disposition in an exhaust gas duct system.

FIG. 3 shows another embodiment of an exhaust gas release structure 4 according to the invention. As shown, the gas release structure 4 includes an outer valve body 19 and in inner valve body 20, the inner valve body 20 being axially movably supported in the outer valve body 19. The inner valve body 20 is used as a valve control member for controlling the release of exhaust gas during motor braking operation and the outer valve body 19 is used as a valve control member during power operation of the internal combustion engine 3.

With this embodiment, the requirement for a sensitive control for the release of exhaust gases from the exhaust gas duct system 1 during motor braking operation can be readily fulfilled. In the embodiment shown in FIG. 2, two different control areas are provided by the different cross-sections of the end portion 14 of the valve body 11; in the present embodiment, the different control areas are provided by the differently sized valve bodies 19 and 20.

The inner valve body 20 has a valve seat 21 arranged within the outer valve body 19. During motor braking operations only the inner valve body is lifted for the release of exhaust gases. The exhaust gas then flows out of the exhaust gas duct system through a control gap 22 between the valve seat surface 23 of the inner valve body 20 and the internal valve body seat 21, through an annular space 24 between the inner valve body 20 and the outer valve body 19 and through a bore 25 in the outer valve body 19.

During power operation of the internal combustion engine 3, the exhaust gas release flow is controlled by the outer valve body 19. The exhaust gas then flows out of the exhaust gas duct system through a control gap 26 between a valve seat surface 27 of the outer valve body 19 and an outer valve seat 28.

For each of the exhaust gas release arrangements as shown in FIGS. 2 and 3, there is provided an operating mechanism 30, 31 which is shown only schematically in the drawings. In the exhaust gas release arrangement 4 as shown in FIG. 2, the valve body 11 is moved by the mechanism; in the exhaust gas release arrangement 4' as shown in FIG. 3, the outer valve body 19 is movable, with the inner valve body 20 disposed therein, relative to the valve seat 28 and the inner valve body 20 is movable relative to the outer valve body 19 that is relative to the internal valve seat 21. The operating mechanism for the movement of the valve bodies may be an electrical, electronic, pneumatic or hydraulic mechanism.

In addition to the performance graphs which contain certain operating parameters a performance graph may be utilized as the basis for processing impulses from an ABS system. This may operate for example in such a way that, utilizing the performance graphs, in a driver compartment of a motor vehicle in which such an internal combustion engine is installed, there is provided a selector by which the driver can set, in a stepless fashion, the maximum power level of the internal combustion engine 3 such that a maximum compressor discharge pressure P-VAS corresponding to a particular engine power output or motorbraking power level is not exceeded. In this way, it can be made sure that, particularly during motor brake operation on icy or wet roads, the behavior of the vehicle can be adjusted by the operator depending on the power output or braking capability of the engine 3 so as to avoid the loss of wheel adhesion to the road.

What is claimed is:

1. An internal combustion engine with an exhaust gas duct system including a turbocharger with a compressor and a turbine having a turbine wheel arranged in the exhaust gas duct system and an exhaust gas release arrangement disposed in said exhaust gas duct system ahead of said turbine wheel, said exhaust gas release arrangement comprising a valve having a valve opening and a valve body with a valve seating surface to be seated on a valve seat, said valve body having a portion extending into said valve opening and having a contour providing for different controllable operating state-based flow cross-sections for the controlled release of exhaust gases from the exhaust gas duct system ahead of said turbine wheel depending on the position of said valve body thereby providing for a greater control sensitivity during motor brake operation than during power operation of the internal combustion engine.

2. An internal combustion engine according to claim 1, wherein, adjacent said valve seating surface, said valve body contour includes an end section projecting into said valve opening and having a contour of a meridian curve adapted to the operating characteristics of the internal combustion engine.

3. An internal combustion engine according to claim 2, wherein said end section includes two distinct areas, a first area disposed adjacent said valve seat surface for the control of the exhaust gas release flow during motor braking operation and a second area adjacent said first area for the control of the exhaust gas release flow during engine power operation.

4. An internal combustion engine according to claim 1, wherein said exhaust gas release arrangement includes at least one operating mechanism by which said valve body is movable relative to said valve seat.

5. An internal combustion engine according to claim 1, wherein said exhaust gas release arrangement includes a valve with a valve seat and an outer valve body movably disposed relative to said valve seat so as to provide a first exhaust gas release control structure with a relatively large cross-section for controlling exhaust gas release from said exhaust gas duct system during engine power operation and an inner valve body coaxially and movably supported within said outer valve body relative to a valve seat having a relatively small cross-section for controlling exhaust gas release from said exhaust gas duct system during motor braking operation of said internal combustion engine.

6. An internal combustion engine according to claim 5, wherein said valve seat for said inner valve body is formed within said outer valve body.

7. An internal combustion engine according to claim 6, wherein, during engine power operation exhaust gas release from the exhaust gas duct system is controllable essentially by activation of the outer valve body.

8. An internal combustion engine according to claim 6, wherein, during motor brake operation, exhaust gas release from the exhaust gas duct system is controllable essentially by actuation of the inner valve body permitting for an exhaust gas release flow through an annular space formed between the inner and the outer valve body and a bore extending through the outer valve body.

9. An internal combustion engine according to claim 1, wherein said exhaust gas release arrangement includes a control circuit with a pressure measuring device for sensing the discharge pressure of the compressor of said turbocharger.

10. An internal combustion engine according to claim 9, wherein said control circuit is adapted to compare the actual discharge pressure P-VA of said compressor with a desired discharge pressure P-VSA of said compressor and to control said exhaust gas release arrangement by controlling the inlet pressure P-TE of said exhaust turbine such that the actual discharge pressure P-VA of the compressor equals the desired discharge pressure P-VSA of the compressor.

* * * * *